(12) United States Patent
Hixon

(10) Patent No.: US 6,401,833 B1
(45) Date of Patent: Jun. 11, 2002

(54) DRY PLANT HARVESTER

(76) Inventor: William K. Hixon, 10345 Amity Rd., Boise, ID (US) 83709

(*) Notice: Subject to any disclaimer, the term of this patent is extended or adjusted under 35 U.S.C. 154(b) by 0 days.

(21) Appl. No.: 09/537,898

(22) Filed: Mar. 28, 2000

(51) Int. Cl.$^7$ .................................................. A01B 1/00
(52) U.S. Cl. ..................................................... 172/378
(58) Field of Search ................................. 172/370, 378, 172/371, 375; 56/201; 111/7.1, 8, 7.2–7.4; 294/49, 50.1, 51, 57, 58

(56) References Cited

U.S. PATENT DOCUMENTS

| | | | |
|---|---|---|---|
| 838,100 A | * 12/1906 | Gilbert | 172/378 |
| 2,279,747 A | 1/1942 | Brandeberry | 97/62 |
| 2,299,378 A | * 10/1942 | Cain | 172/21 |
| 2,378,459 A | 6/1945 | Beardsley | 254/132 |
| 2,780,976 A | * 2/1957 | Koering | 172/378 |
| 2,843,359 A | 7/1958 | Franz et al. | 254/132 |
| 2,909,385 A | 10/1959 | Meredich | 294/49 |
| 2,928,655 A | 3/1960 | Armstrong | 254/132 |
| 3,458,981 A | * 8/1969 | Banner | 172/378 |
| 4,999,057 A | * 3/1991 | Peterson | 111/7.1 |

* cited by examiner

*Primary Examiner*—Robert E. Pezzuto
(74) *Attorney, Agent, or Firm*—Townsend and Townsend and Crew LLP

(57) ABSTRACT

A plant harvesting device with tines and cutting blades, for harvesting dry plants with a thrusting motion. The blades are generally triangular, with a peak between tines, and a valley at each tine. Plant material is trapped between the tine and a cutting blade, and is accumulated on the upper surface of the device.

10 Claims, 4 Drawing Sheets

DRY PLANT HARVESTER

BACKGROUND OF THE INVENTION

1. Field of the Invention

The present invention generally relates to cultivating tools, and more particularly to hand tools for harvesting plants.

2. Background Information

Weeds are a never-ending problem found everywhere. Traditional methods of removing weeds involves millions of man hours annually.

Weed and plant harvesting devices are known in the art. For instance, U.S. Pat. No. 2,909,385 to Meredich shows a garden tool. The Meredich device has spaced parallel and perpendicular blades for digging and breaking apart the soil.

U.S. Pat. No. 2,843,359 to Franz et al. shows a weed digging tool having a blade with a v-shaped notch which is inserted into the ground and lifted upwards so that the weed is pulled out roots and all from the ground. Like many weed pullers, this device uses leverage to extract a weed by lifting it.

U.S. Pat. No. 2,928,655 to Armstrong shows a weed puller. The Armstrong device straps onto a wearer's shoe and contains a v-shaped blade which is inserted into the ground and tilted upwards so that the weed is lifted up roots and all.

U.S. Pat. No. 2,279,747 to Brandeberry shows a weeding tool for grasping weeds and pulling them out by the roots.

And finally, U.S. Pat. No. 2,378,459 to Beardsley shows a weeding tool for insertion in the ground and prying upwards thereby pulling up the weed by its roots.

What is needed is plant harvesting device having a harvesting means used to cut and remove vegetation without pulling the vegetation out by its roots. Such a device would preferably cut vegetation off at or near the surface of the ground, and have the ability to accumulate a quantity of cut plants for eventual collection. The device should preferably have a variable angle of attack, so that the device may slid along the ground and strike the stems of plants near the ground, cutting them off.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

The present invention is a plant harvesting device. In a first embodiment, the device has an elongated handle which attaches to a harvesting means. This harvesting means has a plurality of elongated, generally curved guide means arranged in side by side configuration. Generally between at least two adjacent guide means is located at least one cutting means for cutting and harvesting vegetation. It is preferred that the harvesting means further comprises a harvesting tray for holding harvested vegetation until the user dumps said harvested vegetation from said tray.

In another embodiment, the device is a fork having a handle and a plurality of widely spaced prongs. A blade attachment means, for attaching at least one blade, adjustably attaches to the fork, preferably extending between at least two of the prongs. At least one blade connects to this blade attachment mean.

In another embodiment, the device is an attachment for a standard pitchfork. The device being comprised of two main pieces, a top bar and a bottom bar, which includes the pusher, collector, and clamping piece. The bottom bar has affixed to it the required number of cutting means as well as the fastening devices. The top bar is formed with a 90 degree angle iron to both clamp the unit together and to provide the pushing, collecting and snapping effect (as weed bends back it hits the top angle iron and tends to snap). It also has a little weight which adds energy to the thrust. The bottom bar, which is comprised of the bar and cutting sections, is clamped to the fork on the tines. It is positioned at the bend to allow the sharpened sections to protrude in a downward fashion. The angle of attack can be determined by the operator, by moving the handle up or down. This device cuts off plants in one thrust and is particularly useful for harvesting beans. The bean plants are snapped off by the thrust. The cutting edge of the sections must be against the tines of the fork and the plant can be captured from the sharp edge of the section as well as in the crotch between the sections. The device is used to harvest vegetation and does so by the forward thrusting of the pitchfork. The tines of the pitchfork slide along the ground and the points of the times do not dig into the ground. By rocking the pitchfork up and down the angle of attack of the pitchfork tines is adjusted so that they scoot along the ground rather than dig in. The triangular blades can be moved backward and forward to achieve the right angle for the particular job. The tines of the pitchfork slide along the ground, plants are captured by the triangular blades of the cutters. The plants are captured at ground level. As this device is thrust forward, a mat of harvested plants accumulates and builds up on the angle iron. Periodically the stack of plants which builds up on the angle iron is removed to clear the device.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
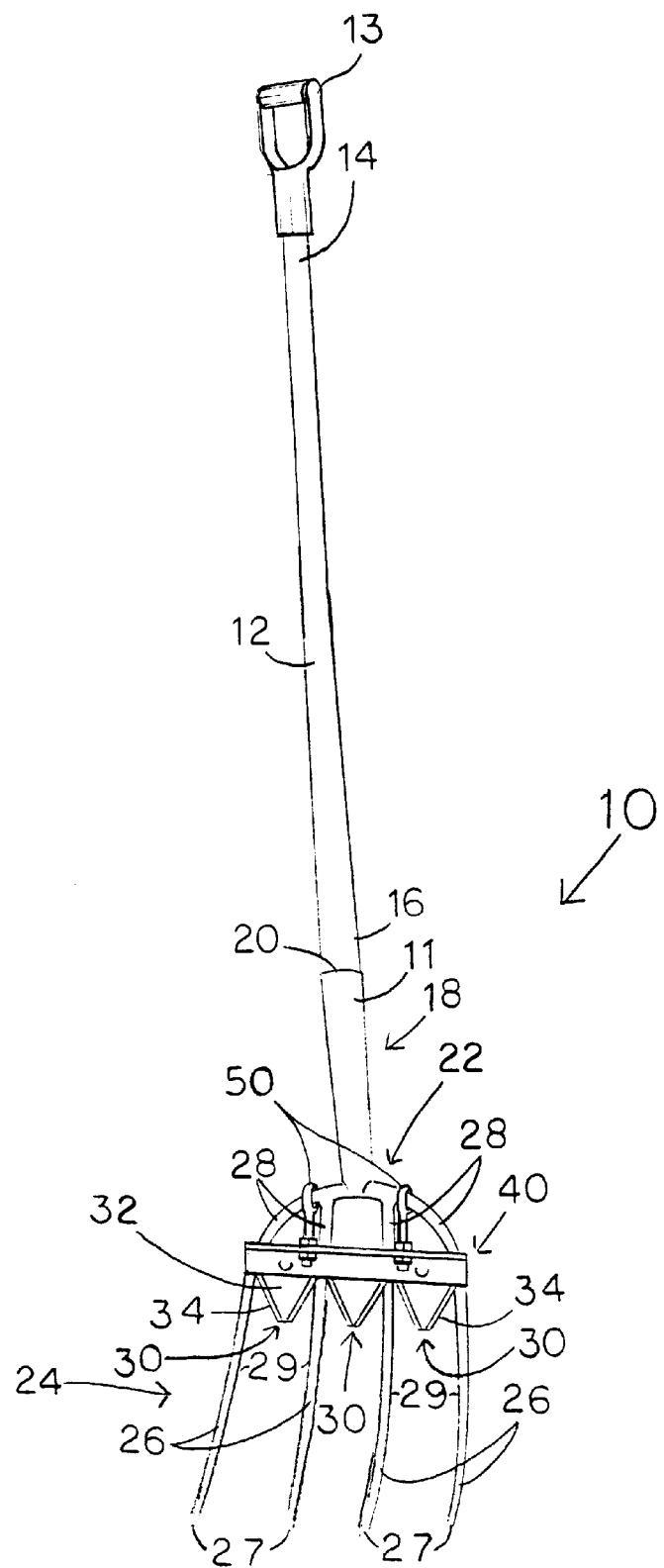
FIG. 1 is a perspective view of the preferred embodiment of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is a plant harvesting device. The preferred embodiment of the present invention is shown in FIG. 1. FIG. 1 shows the plant harvesting device 10 comprising an elongated handle 12 attaching to a fork 11. The elongated handle 12 has a first end 14 and a second end 16. The handle 12 attaches to the fork 11 through a handle attachment means 18. This handle attachment means 18 can be through inserting the second end 16 of the handle 12 into the handle receiving orifice 20 of the handle attachment means 18 or by any other means.

The fork 11 comprises the handle attachment means 18, a guide means attachment means 22, a harvesting means 24, guide means or prongs 26 and at least one sharp cutting means 30. The guide means attachment means 22 attaches the guide means or prongs 26 to the handle 12 and/or the handle attachment means 18. From the guide means attachment means 22, the guide prongs 26 extend there away from so that the prongs 26 have second ends 28 that join to the guide means attachment means 22; middle portions 29 which are generally parallel and arranged in a side by side arrangement; and first ends or points 27 which are also arranged in a generally parallel side by side arrangement.

The harvesting means 24 is the part of the device 10 which harvests vegetation. This harvesting means, in the preferred embodiment, comprises the guide means 26 and the sharp means 30.

Figure 3:
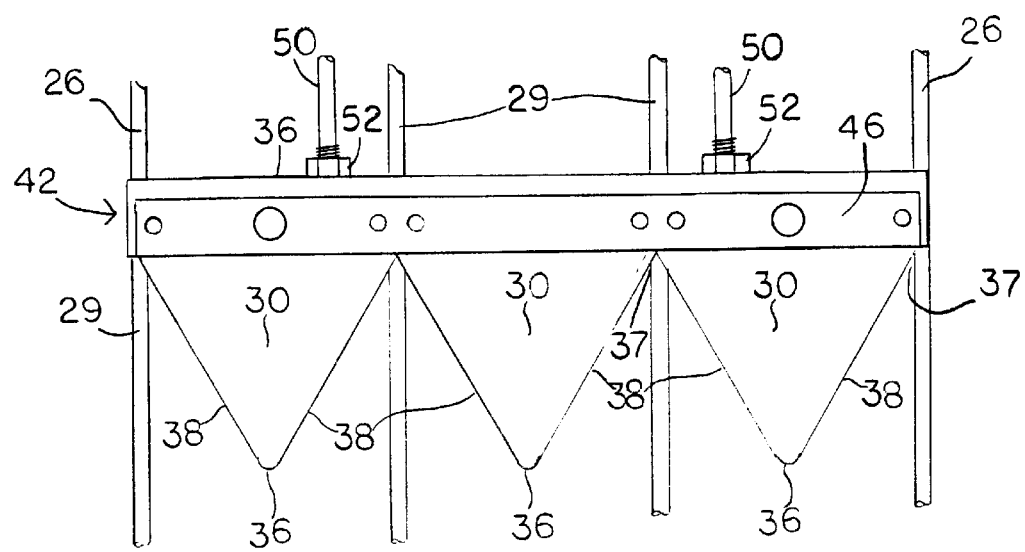
FIG. 3 is a partial bottom view of the harvesting means of one embodiment of the present invention.

Attaching to and generally extending between the prongs 26 are a plurality of cutting means 30. The preferred cutting means 30 are blades 32 as shown in FIG. 1. The preferred blades 32 have two cutting sides or surfaces 38 (as shown in FIG. 3). While in the preferred embodiment there is one cutting means generally between each adjacent guide means 26, it would also be possible to have a plurality of cutting means 30 between adjacent guide means 26. The harvesting means 24 further comprises a harvesting tray 40 for collecting the cut and harvested vegetation so that the user may cut a plurality of plants with the stalks of the plants piling up against the harvesting tray 40 so that the user may harvest a row of vegetation and turn the device 10 over and dump that same harvested vegetation into a pile or container. The harvesting tray 40 is reinforced through use of reinforcing rods 50. These rods 50 keep the harvesting tray 40 stable when being thrust into vegetation to be cut.

FIG. 1 also shows the optional inclusion of a handle grip 13 for assisting in the use of the device 10. This grip is preferably attached to the handle 12 slightly rotated. The preferred rotation is eighteen degrees, however, other degrees may also be suitable. The rotation shown is for a left handed user, and an opposite rotation would be in line for a right handed user. This configuration of handle is very important, since it allows the device to be used in an ergonomically advantageous way. With the rotated handle shown in FIG. 1, a user's right hand would grip the handle somewhere in midshaft, and would support the weight of the handle and attached device by the strong bicep muscle. The left hand would grip the handle grip 13 so that the palm is facing the tool. When force is applied to the tool with the left hand, the force through the wrist would flex the palm toward the users body, a comfortable movement. If the user's left hand were on a handle without a handle grip, it would be less favorable, because the palm would be down, the back of the hand would be up, the fingers would be wrapped around the handle, and the wrist would have to flex in a lateral motion as force was applied to the tool. This would cause fatigue if not injury.

Figure 2:
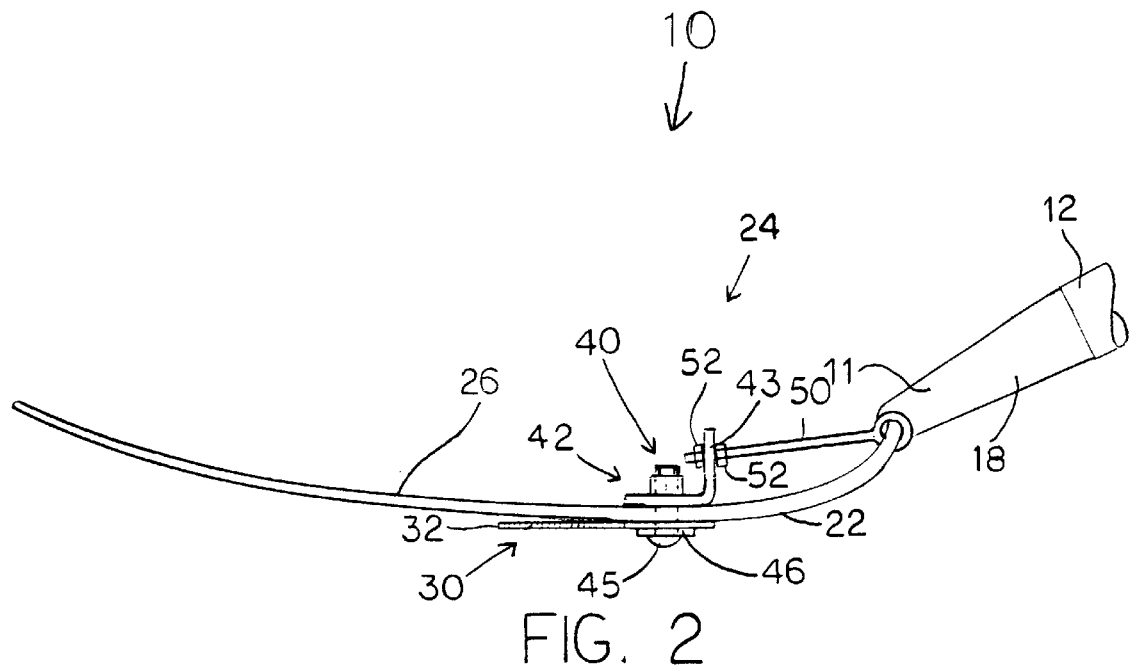
FIG. 2 is partial side view of the another embodiment of the present invention.

Referring now to FIG. 2, a partial side view of another embodiment of the present invention is shown. In this view, we can see the elongated handle 12 as it attaches to the fork 11. This view particularly shows the harvesting means 24. In this embodiment, the cutting means 30 is shown attached slightly below the guide means 26. It is to be understood that these cutting means 30 would still be spaced generally in between adjacent guide means or prongs 26. In this embodiment we can see the harvesting means 24 further comprises a top bar 43. The preferred top bar 43 is a length of standard angle iron. This top bar has a plurality of holes extending therethrough for receiving fastener means 45 such as the nut and bolt shown. This fastener means 45 will also be able to extend through holes (not shown) extending through the blade 32 of the cutting means 30. This is done so that the cutting means 30 can be rigidly attached to the prongs 26. The blade attachment means 42 is used to attach the cutting means 30 to the guide prongs 26. The top bar 43 assists in defining and creating the basis for the harvesting tray 40 so that when vegetation is cut by the cutting means 30, the stalks of said vegetation will fall and rest upon the top bar 43 until the user takes the device and dumps the cut vegetation off of it. As shown in FIG. 1, the harvesting tray 40 is reinforced through use of reinforcing rods 50. The preferred rods 50 are eyebolts which attach through a hole in the top bar 43 through nuts 52.

FIG. 3 shows a bottom view of another embodiment of the harvesting means 24. In this embodiment, one can see the plurality of side by side guide means or prongs 26. In this embodiment we can see one cutting means 30 located between each adjacent guide means 26. These cutting means 30 preferably have cutting sides 38 which are obliquely angled to the guide prongs 26. These cutting sides 38 provide the cutting surface for the cutting means 30. The blade attachment means 42 is used to attach the cutting means 30 to the guide prongs 26. It is preferred that the tips of these cutting means 30 be slightly rounded. The bottom bar 46 attaches through use of the fastener means 45 to the cutting means 30. As in the preferred embodiment, the guide means 26 extends between the cutting means 30 and bottom bar 46 in this fashion.

Alternatively, the cutting means 30 may be generally trapezoidal shaped, said trapezoid having two parallel sides 36 and two other sides 38, wherein said other sides 38 comprise cutting surfaces, with said cutting surfaces oriented generally obliquely to said guide means, said parallel sides generally perpendicular to said guide means.

Figure 4:
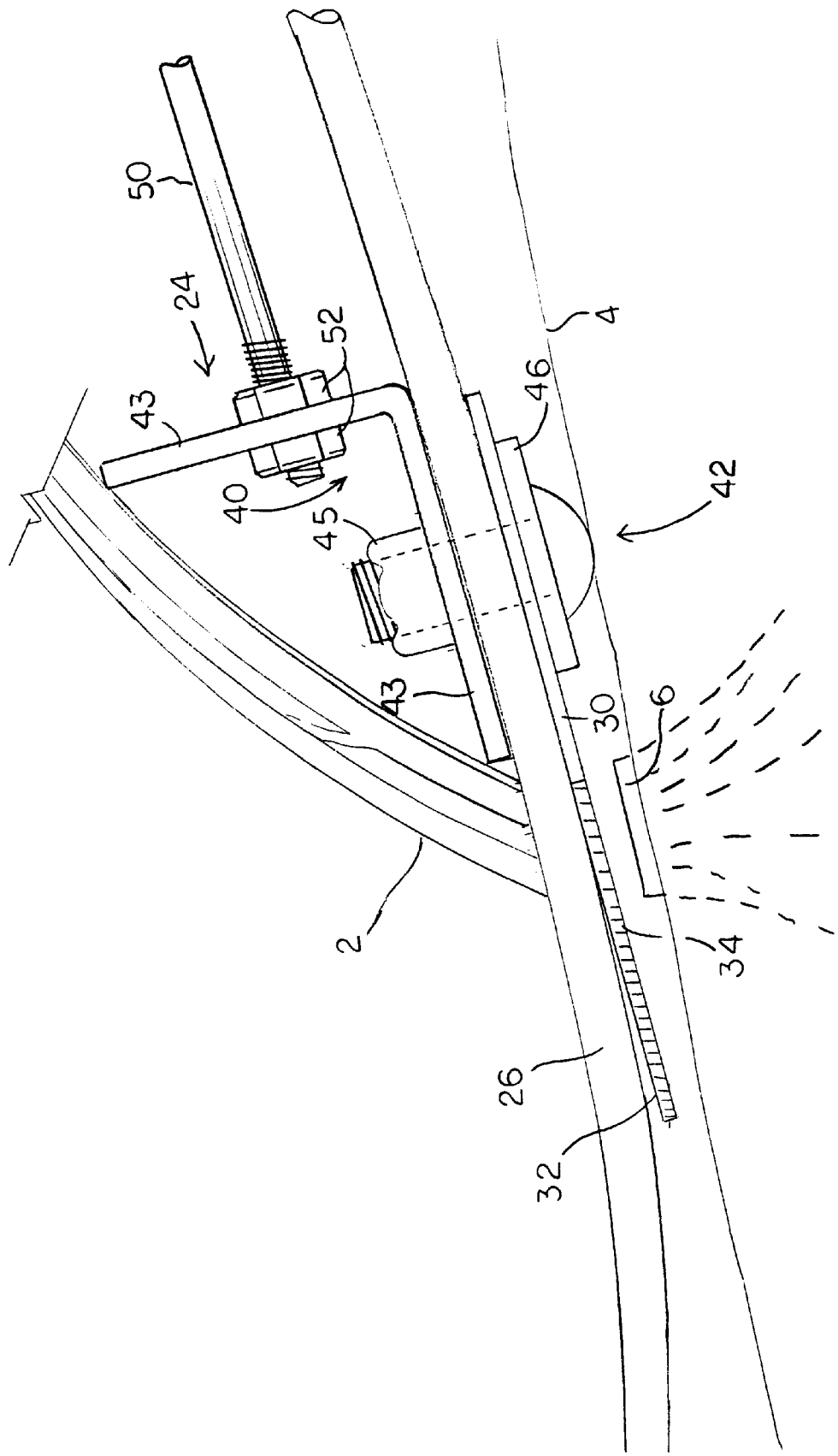
FIG. 4 is a partial environmental view of another embodiment of the present invention.

Referring to FIG. 4, a side view of the present invention in use is shown. In this view, one can see how the guide means 26 are in use, slid along the ground surface 4, thereby controlling the angle of attack of the cutting means 30 as it relates to the vegetation 2. This view shows the cutting means 30 after it has severed the vegetation from its stump and roots. In this view, one can see how the harvesting tray 40 is used to collect cut vegetation. This view also shows the harvesting means 24 in greater detail. In this view, one can see the top bar 43 attaching to the cutting means 30 through use of a fastener means 45 with the guide prongs 26 extending there between. In this embodiment, a bottom bar 46 is utilized to assist in the attachment to the cutting means 30.

The device is used by sliding the guide means along a ground surface. As the guide means 26 slide, vegetation enters the cutting means 30 and is cut. Severed plant matter piles up on the device, particularly stacking against the harvesting tray. After the user has made sufficient cutting passes, the user is able to lift the device off the ground, carry it to a desired location, and dump the stacked plant matter into a pile or container. The cutting action is facilitated through the vegetation sliding between the guide means and the cutting edges of the cutting means. When the vegetation reaches the valley of the harvesting means, the vegetation becomes pinched between the blade and the guide means and is easily cut by the blade.

Figure 5:
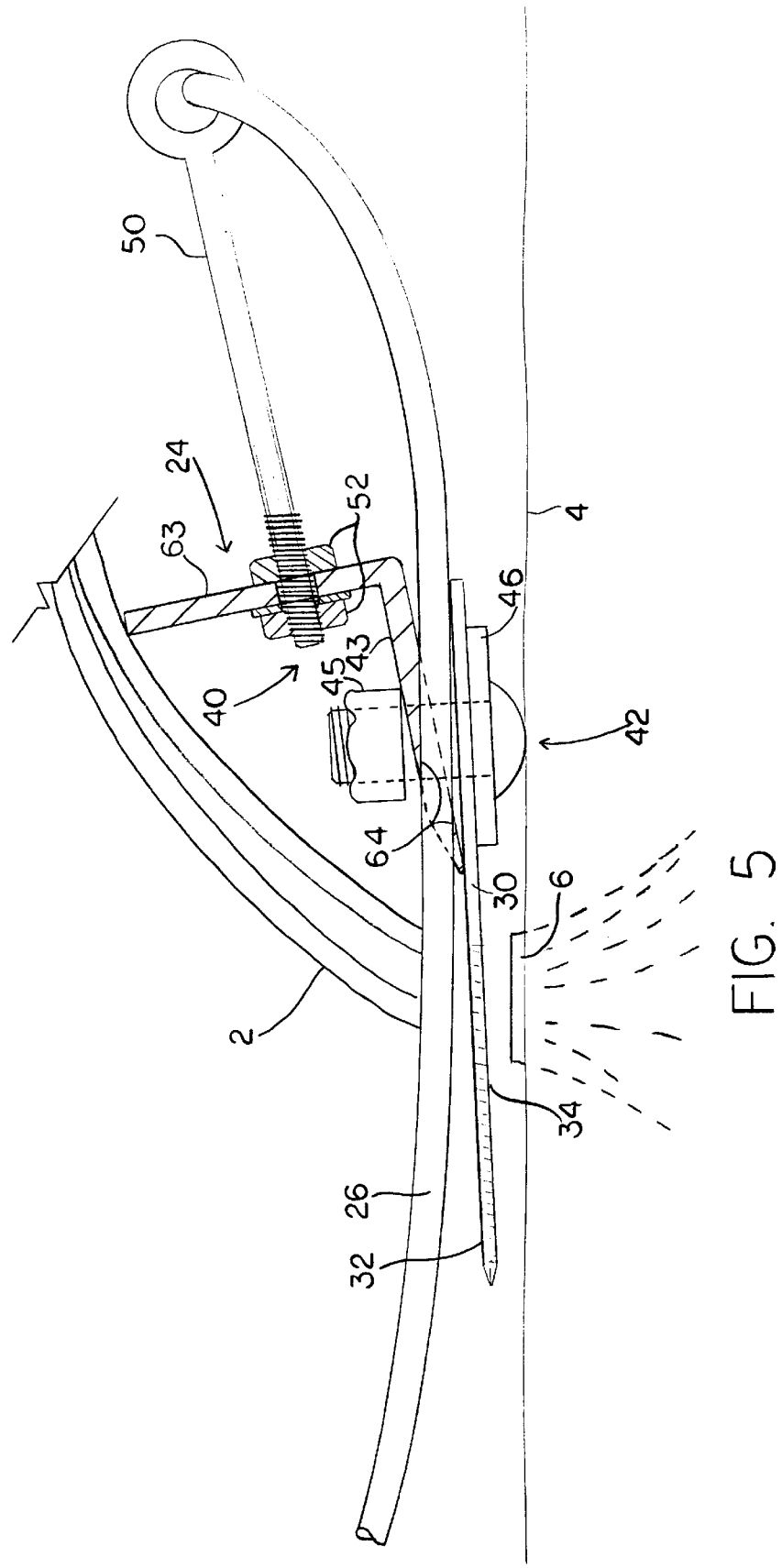
FIG. 5 is a partial environmental view of another embodiment of the present invention.

Referring to FIG. 5, a side view of the present invention in use is shown. This view shows blade 32 and cutting means 30 disposed at a greater angle from prong 26, as compared to that shown in FIG. 4.

While the figures show use of a four-tine fork, any other type of numbered fork may also work, for instance a three-tine fork, a five-tine fork, or others. The fork and handle may also be a standard pitchfork. The position of the top bar and bottom bar can be adjusted by sliding along the tines, to achieve the desired angle for a particular task.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A plant harvesting device comprising:
   an elongated handle, said elongated handle having a first end and a second end, with said second end attaching to a harvesting head;
   said harvesting head comprising a plurality of elongated, generally curved tines arranged in side by side configuration, each of said tines having a first end, a second end and a middle portion, said tines having generally parallel middle portions and generally parallel first ends, said second ends joining to adjacent tine second ends and connecting to said elongated handle, wherein there is interposed between and inferior to adjacent tines at least one cutting blade for harvesting vegetation;
   a bar coupled to the at least one cutting blade; and,
   a reinforcing rod coupled to the bar and to the second end of at least one tine,
   with said harvesting device configured for harvesting vegetation with a thrusting motion of said plant harvesting device.

2. The plant harvesting device of claim 1, wherein said cutting blade is generally V-shaped with cutting sides, positioned inferior to said tines and between each tine, with said cutting sides of said cutting blade forming a peak between said tines, and a valley adjacent to said tines.

3. The plant harvesting device of claim 1, wherein said cutting blades are generally trapezoidal shaped, said trapezoid having two parallel sides and two other sides, wherein said other sides comprise cutting surfaces, with said cutting surfaces oriented generally obliquely to said tines, said parallel sides generally perpendicular to said tines.

4. The plant harvesting device of claim 1, wherein said harvesting head further comprises a harvesting tray for accumulating cut vegetation.

5. The plant harvesting device of claim 4, wherein said harvesting tray further comprises at least one reinforcing rod for supporting said harvesting tray.

6. The plant harvesting device of claim 1, wherein said elongated handle further comprises a handle grip attached at an 18 degree angle from said harvesting head of said device.

7. The plant harvesting device of claim 6, in which said handle grip is a D shaped handle attached at an 18 degree angle from said harvesting head of said device.

8. A bean harvesting device for harvesting beans, said device comprising:
   a fork having a plurality of spaced tines, said tines having points;
   a handle attached to said fork, said handle comprising a D-shaped handle attached at an 18 degree angle from said fork;
   a blade attachment means for attaching at least one blade inferior to said tines of said fork, said blade attachment means extending between at least two tines, wherein said blade attachment means comprises:
   a top bar, said top bar having a plurality of holes therethrough for receiving a plurality of fasteners; and
   a bottom bar, said bottom bar having a plurality of holes therethrough for receiving said plurality of fasteners;
   a reinforcing rod coupled to the top bar and to a second end of at least one tine;
   wherein said blade attachment means attaches to said fork by securing with said fasteners said tines between said top bar and said bottom bar, with said top and bottom bars generally perpendicular to said tines; and,
   at least one blade, said blade connecting to said blade attachment means inferior to said tines, said blade having cutting surfaces oriented generally obliquely to said tines;
   whereby said bean harvesting device is thrust forward on said tines along a ground surface, forming a compaction and cutting zone between said blade and said tines for cutting said beans, and with said cut beans stacked and retained against said top bar.

9. A plant harvesting device comprising:
   a fork having a plurality of spaced tines, said tines having points, and said fork having a handle;
   a blade attachment means for attaching at least one blade inferior to said tines of said fork, said blade attachment means extending between at least two tines; wherein said blade attachment means comprising a bar,
   a reinforcing rod coupled to the bar and to the second end of at least one tine; and
   at least one blade with a cutting edge, said blade connecting to said blade attachment means, said blade cutting edge oriented toward said points of said tines;
   whereby said plant harvesting device is configured to cut and accumulate plant materials for harvesting when said fork is thrust forward along a ground surface, so that said tines slide under vegetation and said vegetation is cut between said tines and said blade;
   and an angle of attack of said blade and a cutting height of said blade is adjustable by varying an elevation of said handle of said fork in use.

10. The plant harvesting device of claim 9, in which said handle comprises a D handle attached at an 18 degree angle from said harvesting head of said device.

* * * * *